UNITED STATES PATENT OFFICE.

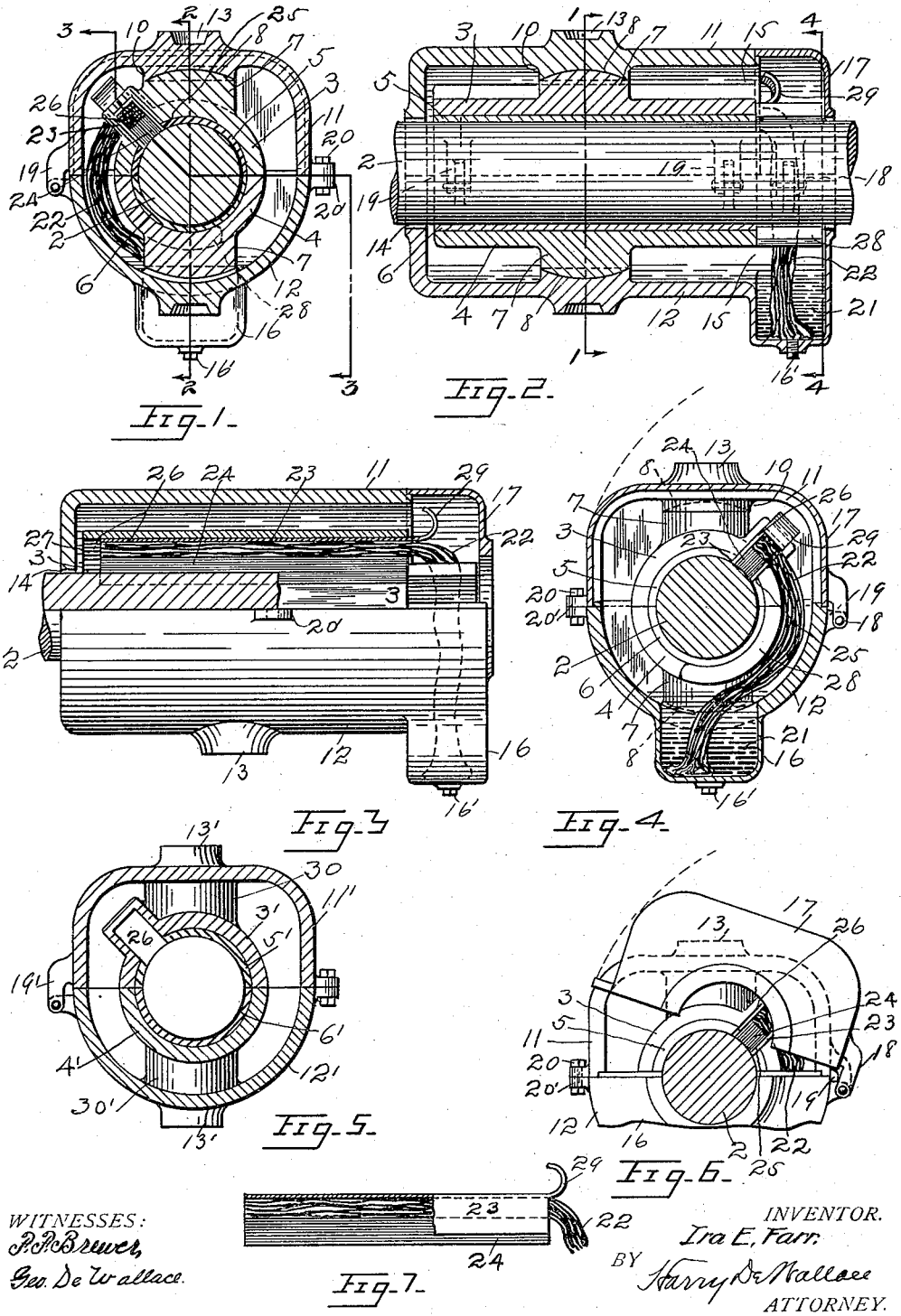

IRA E. FARR, OF SANDUSKY, OHIO, ASSIGNOR OF ONE-HALF TO JOSEPH V. BARON, OF WATERTOWN, NEW YORK.

SELF-LUBRICATING SHAFT-BEARING.

1,156,071.   Specification of Letters Patent.   Patented Oct. 12, 1915.

Application filed November 22, 1913.   Serial No. 802,583.

*To all whom it may concern:*

Be it known that I, IRA E. FARR, a citizen of the United States, residing at Sandusky, in the county of Erie and State of Ohio, have invented certain new and useful Improvements in Self-Lubricating Shaft-Bearings, of which the following is a specification.

This invention relates to improvements in self-lubricating shaft bearings, and has for its object to provide novel and simple means for supporting a shaft or journal for rendering the same self-adjustable.

A further object is to provide novel and simple means for maintaining the lubrication of the shaft or journal for long intervals without attention or care, and for reclaiming, and returning the surplus or waste oils to the source of supply, for repeated use. And a further object is to provide novel and convenient means for applying and removing the lubricant conductors without disturbing either the shaft or the bearings.

The various features and parts of the invention will be understood from the detailed description which follows, and by reference to the accompanying drawing, in which—

Figure 1 is a central cross-section substantially on line 1—1 of Fig. 2. Fig. 2 is a central longitudinal section substantially on line 2—2 of Fig. 1. Fig. 3 is a longitudinal section substantially on line 3—3 of Fig. 1. Fig. 4 is a cross-section taken on line 4—4 of Fig. 2. Fig. 5 is a view of a modification of the device; showing each half of the bearing made integral with the corresponding section of the casing. Fig. 6 is a partial end elevation; showing the hinged cap raised for inspecting the bearing, and also for replenishing the supply of the lubricant. Fig. 7 is a detail view; showing the felt and wicks which feed the lubricant to the shaft; also showing the detachable holder for said parts.

In the drawing, 2 represents a shaft or journal, which is supported by a split bearing comprising top and bottom sections 3 and 4, which are substantially semi-cylindrical, and which are lined or bushed with similar babbitt parts, as 5 and 6, which bear directly against the shaft. The bearing parts 3 and 4 are provided intermediate their ends with similar oppositely facing projections 7, the outer faces of which are curved to fit and pivot in corresponding sockets 8 formed in the inner surfaces or ends of inwardly projecting bosses 10, which are preferably integral parts of top and bottom sections 11 and 12 of a split casing, which surrounds, incloses and supports the bearings 3 and 4, and 13 represents opposite outwardly facing sockets arranged concentric to the sockets 8, for receiving parts of the usual shaft hangers (not shown). The casing 11 and 12 has an opening 14 at one end which is slightly larger than the shaft 2, so as to allow the shaft, and the bearing 3—4, to rock on the pivots 7—8, in case the shaft does not line truly with the casing. The opposite end of the casing has a full opening 15, which communicates with a depending oil well 16, a portion of which extends below the bottom sides of the section 12, of which it is preferably an integral part. The oil cavity extends upwardly to within a short distance of the underside of the shaft 2.

16′ represents a screw plug in the bottom of the reservoir 16 which may be removed for drawing off the oil and removing any sediment.

17 represents a cap that is hinged at 18 to one side of the oil reservoir, and is employed for affording access for filling the reservoir, as well as for inspecting and adjusting the bearings and lubricating parts. The sections 11 and 12 of the casing are connected at one side by hinges 19, and are held in closed position by any suitable means, as by bolts 20 which pierce lugs 20′ at the opposite side. The oil, as 21 carried by the well or vat 16, is conducted to the shaft 2 by means of a series of wicks or similar strands 22, the lower ends of which are immersed in the oil, while their upper ends are disposed lengthwise in a hollow holder 23. The wicks 22 carry the oil from the well to the holder by capillary feed and distribute the oil substantially the whole length of the split bearing 3—4. The oil is then taken from the wicks 22 by a strip of felt 24, which is fitted into the open side of the holder 23 and contacts with the wicking. The outer or exposed edge of the felt 24 lies in a slot 25 formed in the babbitt 5, and bears directly against the upper side of the shaft 2, as best seen in Figs. 1, 3, 4 and 6. The holder 23 is inserted in a longitudinal slot or way 26, which comprises a hollow rib on the bearing section or cap 3. One end 27 of the way 26 is closed principally for limiting the insertion of the wick holder 23 (see Fig. 3), while the opposite end of the way 26 opens into the cavity formed by the cap 17. Under this construction and arrangement, by lifting up the cap 17, as shown in Fig. 6, the wick holder 23 may be inserted or removed without disturbing the bearing or its casing. The free ends of the wicks 22 pass downwardly at one side of the shaft 2 in the space between the bearings 3—4 and the casing 11—12, and the wicks are held from contact with the shaft by a guard 28, which is preferably an extension of the lower bearing section 4, as shown in Figs. 2 and 4. 29 represents a hook formed on the outer end of the wick holder 23, which affords a finger hold for pulling the wicks and felt out of the way 26.

Fig. 5 illustrates a modification of the shaft and journal bearing, in which the top bearing section 3', and the corresponding section 11' of the casing are cast or formed as one part, and these are connected by means of one or more posts or parts 30. Likewise the lower bearing section 4' is integral with the casing 12' by means of a similar post 30'. These combined sections are connected by a hinge 19', and the said parts are usually held together by bolts the same as described. Otherwise the modified device has the same functions and will do the same work as the main device, except that the bearing sections are incapable of rocking or changing their positions independently of the casing.

The bearing sections 3 and 4 are preferably shorter than the casing 11—12, as shown, so as to afford a clear space between the ends of these parts for the oil which escapes from the ends of the bearing to drip into the lower portions of the casing 12, from which it flows back into the reservoir 16, or else mingles with the supply of oil in the casing when the reservoir is filled to the extent shown in Figs. 2 and 4. In this way no oil is lost or wasted, and the surplus oil is reclaimed, and is carried back to the shaft by the wicks 22 for continuously lubricating the shaft. The amount of oil supplied to the shaft 2 may be varied in a simple manner by withdrawing one or more of the wicks from the reservoir 16.

By the provision of the oil reservoir 16, a supply of oil sufficient to lubricate a shaft or journal for several weeks may be poured into the reservoir, and the latter may be tightly closed for excluding air, dust and dirt by means of the cap 17. The novel construction and arrangement of the wicks 22 and the felt 24, together with the provision of the readily detachable holder 23, constitute valuable features of the present invention. Shaft journals equipped with my improvement are always readily accessible for inspection, and the lubricating parts may be applied, removed and renewed, and the supply of oil may be replenished, at will, without in any way disturbing the main parts of the device, and without requiring the stopping of the shaft.

Having thus described my invention, what I claim as new and desire to secure by Letters Patent, is—

1. In a lubricating device, the combination of a shaft, a bearing therefor having a longitudinally extending pocket therein, a sliding carrier for holding a lubricating pad mounted in said pocket and adapted to slide endwise of the shaft.

2. In a lubricating device, the combination of a shaft, a bearing therefor, a casing inclosing the bearing, said bearing provided with spaced parts for engagement with the casing to support the same therein, the bearing having a longitudinally extending recess and projecting sides arranged on each side of the recess, a carrier having a lubricating pad therein mounted in said recess, and a handle attached to the carrier for sliding the same endwise of the shaft and means carried by the casing to permit the insertion and removal of the same to and from the pocket.

3. In a lubricating device, the combination of a shaft, a bearing therefor, a casing inclosing the bearing and providing a support for the same, the bearing being provided with a longitudinally extending recess, a removable carrier for a lubricating pad arranged in the recess, and a door on the casing to permit the moving of the carrier to and from the recess endwise of the shaft.

4. In a lubricating device, the combination of a shaft, a bearing therefor, a casing inclosing the bearing and providing a support for the same, the said bearing being provided with a recess, a removable carrier for a lubricating pad engaging the recess, and a door on the casing to permit the insertion of the carrier and removal of the same to and from the recess without stopping the shaft.

5. In a lubricating device, the combination of a bearing having a longitudinally extending pocket therein a removable carrier for holding a lubricating pad mounted in said pocket, means associated with said pocket for preventing lateral movement of the carrier, and means for sliding the carrier endwise of the shaft.

In testimony whereof I affix my signature in presence of two witnesses.

IRA E. FARR.

Witnesses:
Thos. S. Amato,
Harry W. Farr.

Copies of this patent may be obtained for five cents each, by addressing the "Commissioner of Patents, Washington, D. C."